(12) United States Patent
Vaghani et al.

(10) Patent No.: US 10,430,392 B2
(45) Date of Patent: Oct. 1, 2019

(54) COMPUTER FILE SYSTEM WITH PATH LOOKUP TABLES

(71) Applicant: VMware, Inc., Palo Alto, CA (US)

(72) Inventors: Satyam B. Vaghani, San Jose, CA (US); Yuen-Lin Tan, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 483 days.

(21) Appl. No.: 14/746,707

(22) Filed: Jun. 22, 2015

(65) Prior Publication Data

US 2015/0286657 A1    Oct. 8, 2015

Related U.S. Application Data

(62) Division of application No. 12/110,660, filed on Apr. 28, 2008, now Pat. No. 9,088,591.

(51) Int. Cl.
| | |
|---|---|
| G06F 16/00 | (2019.01) |
| G06F 16/185 | (2019.01) |
| G06F 16/13 | (2019.01) |
| G06F 16/16 | (2019.01) |
| G06F 16/901 | (2019.01) |
| G06F 11/14 | (2006.01) |
| H04L 29/08 | (2006.01) |

(52) U.S. Cl.
CPC ........ G06F 16/185 (2019.01); G06F 11/1435 (2013.01); G06F 16/13 (2019.01); G06F 16/162 (2019.01); G06F 16/9017 (2019.01); H04L 67/1097 (2013.01)

(58) Field of Classification Search
CPC .......................... G06F 17/30221; G06F 16/185

USPC .................................................. 707/796, 829
See application file for complete search history.

(56) References Cited

U.S. PATENT DOCUMENTS

| | | | |
|---|---|---|---|
| 6,044,379 A | 3/2000 | Callsen | |
| 6,618,792 B1* | 9/2003 | Perrin | G06F 16/10 711/122 |
| 7,272,654 B1* | 9/2007 | Brendel | G06F 16/13 709/229 |
| 7,752,226 B1* | 7/2010 | Harmer | G06F 16/13 707/796 |
| 7,822,836 B1* | 10/2010 | Saparoff | H04L 41/0233 709/223 |
| 7,822,927 B1* | 10/2010 | Scheer | G06F 12/0866 707/829 |
| 2006/0047712 A1 | 3/2006 | Shitomi et al. | |
| 2006/0212495 A1* | 9/2006 | Tokunaga | G06F 16/2282 |
| 2007/0038748 A1 | 2/2007 | Masuyama | |
| 2007/0192551 A1 | 8/2007 | Hara et al. | |
| 2009/0165003 A1 | 6/2009 | Jacobson et al. | |

OTHER PUBLICATIONS

International Search Report and Written Opinion as mailed in PCT Application No. PCT/US2009/040305 dated Nov. 26, 2009.

* cited by examiner

*Primary Examiner* — Chelcie L Daye
(74) *Attorney, Agent, or Firm* — Patterson + Sheridan, LLP

(57) ABSTRACT

A namespace is provided in a file system that employs logical volumes. With the namespace, the file system can withstand data storage units going offline without compromising accessibility of the files in the data storage units that remain online. The files in the online data storage units remain accessible through the use of path lookup tables that are stored in the online data storage units.

18 Claims, 14 Drawing Sheets

APL Table
300

| Length | Index Number | Path | OID |
|---|---|---|---|
| Length 311 | Index Number 314 | /foo | OID 317 |
| Length 312 | Index Number 315 | /foo/bar | OID 318 |
| Length 313 | Index Number 316 | /foo/bar/baz.txt | OID 319 |
| . . . | . . . | . . . | . . . |
| | | | |

Figure 3A

COMPUTER FILE SYSTEM WITH PATH LOOKUP TABLES

CROSS-REFERENCE TO RELATED APPLICATIONS

This application is a divisional of, and claims the benefit of, U.S. patent application Ser. No. 12/110,660 filed Apr. 28, 2008 entitled "Computer File System with Path Lookup Tables," which is incorporated by reference herein.

BACKGROUND OF THE INVENTION

File systems typically organize objects as files in a hierarchy of directories, and an inode is assigned to each of the files and to each of the directories. A file inode includes references to data blocks of user data. A directory inode includes references to data blocks that contain filenames, which may correspond to either a directory or a file, and inode numbers corresponding to the filenames.

Applications access files using fully qualified paths to the files and a namespace indicates the paths that lead to valid inodes corresponding to such files on the file system. As such, the availability of the inodes and hence user data on the file system is a direct function of availability of the namespace, since files are accessed using their path names.

The availability of inodes becomes difficult to ensure when a file system employs a logical volume manager. A logical volume manager is a software or firmware component that organizes a plurality of data storage units into an ordered set of physical extents called a logical volume. The logical volume is available in the form of a logical device with a contiguous address space on which a file system is laid out. The logical volume enables useful enterprise features such as the ability to hot-replace data storage units without changing the file system address space, hot-extend logical volume length by adding new data storage units, provide software redundant array of inexpensive disks (RAID) availability features, implement data mirroring and replication over multiple data storage units, and the like.

When a file system uses logical volumes, the file system no longer controls physical placement of inodes on data storage units. The file system only controls inode layout in the logical volume address space. The mapping of inodes in the logical volume address space to data storage units is done outside the file system's control by the logical volume manager such as based on availability. Consequently, inodes may be scattered over data storage units with different inodes residing in different data storage units. As one example, a file represented by the path "/root/dir1/dir2/example.doc" may have inodes for the directories (directory inodes) and the file (file inode) residing in different data storage units.

Thus, in a file system that employs logical volumes, availability of the namespace and file objects referenced by paths is contingent on availability of all the data storage units that comprise a logical volume. If one or more of the data storage units comprising a logical volume go offline, a file may not be accessible by the file system, because the inode corresponding to one or more of the file's path components, e.g., /dir1 or /dir2, may not be available.

SUMMARY OF THE INVENTION

A file system according to an embodiment of the invention is able to access files of online data storage units using a path lookup table that is stored in each of the online data storage units. The path lookup table may be used with existing distributed, clustered, or local file systems irrespective of how the file system internally implements and lays out its file hierarchy. Alternatively, the path lookup table may be used as a stand-alone solution for addressing files in a hierarchy of a file system.

A method of generating a hierarchical file system, according to an embodiment of the invention, includes the steps of creating a first table of path entries that specify paths for a first set of file objects that are stored in a first data storage unit, storing the first table in the first data storage unit, creating a second table of path entries that specify paths for a second set of file objects that are stored in a second data storage unit, and storing the second table in the second data storage unit.

A method of determining an object identifier of a file object stored in a hierarchical file system having a first set of file objects and a first path lookup table stored in a first data storage unit and a second set of file objects and a second path lookup table stored in a second data storage unit, according to an embodiment of the invention, includes the steps of determining a path entry corresponding to a file object from one of the first and second path lookup tables, and reading an object identifier from the path entry corresponding to said file object.

BRIEF DESCRIPTION OF THE DRAWINGS

FIG. 3A is a diagram of an alternate path lookup (APL) table in accordance with one or more embodiments of the invention;

DETAILED DESCRIPTION

In the following description, numerous specific details are set forth to provide a more thorough understanding of the invention. However, it will be apparent to one of skill in the art that one or more embodiments of the invention may be practiced without one or more of these specific details. In other instances, well-known features have not been described in order to avoid obscuring the invention.

Figure 1A:
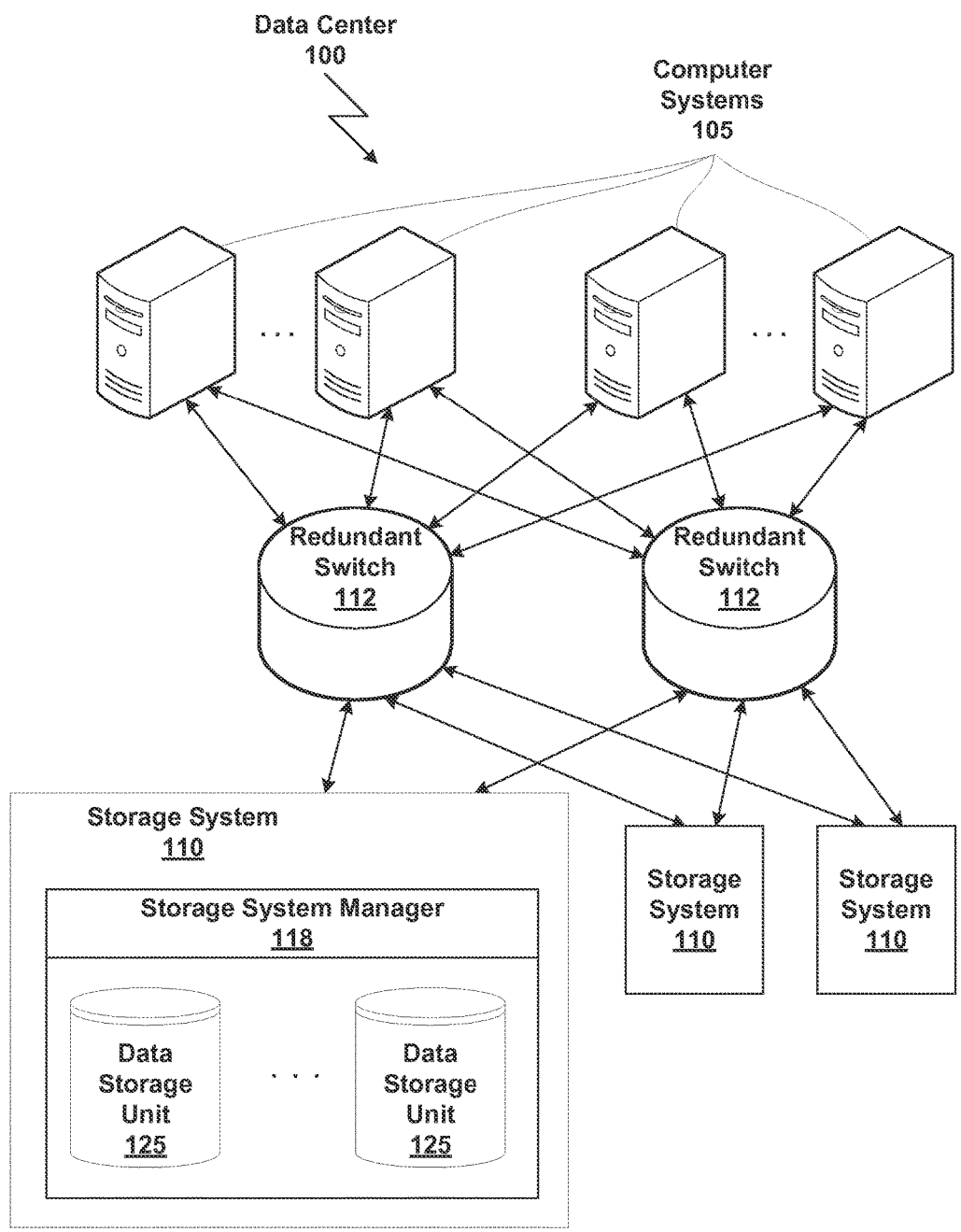
FIG. 1A is a block diagram illustrating a data center configured to implement one or more embodiments of the invention.

FIG. 1A is a block diagram illustrating a data center 100 configured to implement one or more embodiments of the invention. Several computers are configured as computer systems 105 to provide a large-scale data center 100. In a typical enterprise level system, underlying data storage systems may adopt the use of storage area networks (SANs). As is conventionally well appreciated, SANs provide a number of technical capabilities and operation benefits, fundamentally including virtualization of data storage devices, e.g., storage systems 110, redundancy of physical devices with transparent fault-tolerant fail-over and fail-safe controls, geographically distributed and replicated storage, centralized oversight, and storage configuration management decoupled from client-centric computer systems management. Although one or more embodiments of the invention are described in the context of a data center, one or more embodiments of the invention may be used to provide a hierarchical namespace for distributed, clustered, or local file systems.

Architecturally, a SAN storage subsystem is characteristically implemented as a large array of Small Computer System Interface (SCSI) protocol-based storage devices, e.g., computer systems 105, redundant switches 112, and storage systems 110. The SAN can be implemented using any of a variety of technologies, though typically using Fibre Channel or iSCSI technology. These technologies allow construction of a redundant, failover and multipath capable interconnection network, using for example redundant switches 112 and network connections, that in turn, ensure overall reliability. In a typical implementation, additional data management features are implemented through logical volume managers and data access layers executed in a server tier of computer systems 105. Client computer systems are constrained to mounting and accessing data storage volumes through the server tier and thereby effectively inherit the logical unit management functions implemented by the logical volume managers of the server tier. Logical volume managers, however, can be and frequently are implemented at multiple levels including in client computer systems.

A storage system manager 118 is executed on storage systems 110 to implement a virtualization of the physical, typically disk drive-based storage units. Storage system manager 118 is thus able to aggregate disk drives/physical storage units into one or more logical storage containers, e.g., data storage units 125. This virtualization of data storage units 125 allows a more efficient utilization of the underlying physical storage through logical aggregation into a contiguous container storage space according to various policies. These data storage units 125 can be allocated by storage system manager 118 as externally visible and accessible data storage units with unique identifiers. Storage system manager 118 performs real to virtual translations necessary to support the presentation of data storage units 125 to computer systems 105 for use as, in effect, standard SCSI-based storage. The logical storage containers may be dynamically reconfigured and expanded depending on demand patterns without materially affecting the ongoing use of a particular data storage unit 125 by computer systems 105. As a result, the presentation of data storage units 125 can be preserved even while maintenance is performed on an array of physical storage units.

Figure 1B:
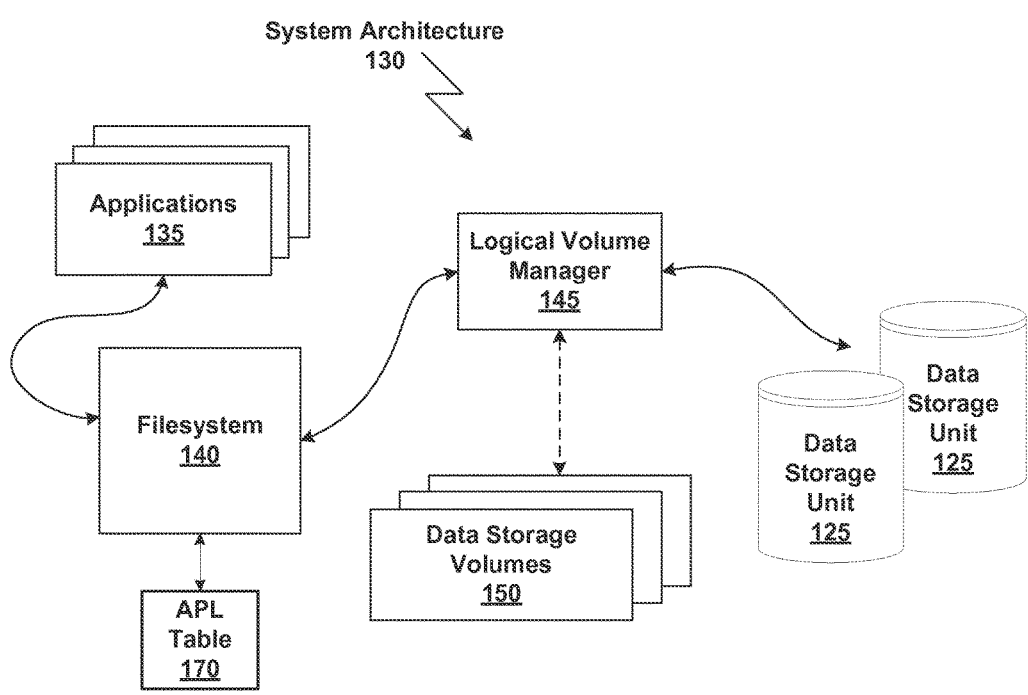
FIG. 1B is a block diagram illustrating a system architecture configured to implement one or more embodiments of the invention.

FIG. 1B is a block diagram illustrating a system architecture 130 that is configured to implement one or more embodiments of the invention. As generally illustrated in FIGS. 1A and 1B, a typical system architecture 130 implements a logical volume manager 145 on a computer system 105, that is, at a system tier, above data storage units 125, and, as a software layer, beneath a filesystem 140. By execution of logical volume manager 145, filesystem 140 is presented with a data storage view represented by one or more discrete data storage volumes 150, each of which is capable of containing a complete filesystem data structure. The specific form and format of the filesystem data structure is determined by the particular filesystem 140 employed. Any of the New Technology filesystem (NTFS), the Unix filesystem (UFS), the VMware Virtual Machine filesystem (VMFS), and the Linux third extended filesystem (ext3FS) may be used as filesystem layer 140.

Filesystem 140 creates and maintains an APL (alternate path lookup) table 170 as a data structure to provide a hierarchical namespace for data storage volumes 150. Additionally, subsets of APL table 170 are stored on data storage units 125, as described in conjunction with FIG. 2A. Any of computer systems 105 of FIG. 1A may be configured to store APL table 170 and restore the subsets of APL table 170 that are stored on data storage units 125. APL table 170 may be used with existing distributed, clustered, or local file systems irrespective of how the file system internally implements and lays out its file hierarchy.

As is conventional for logical volume managers, each of data storage volumes 150 is functionally constructed by logical volume manager 145 from an administratively defined set of one or more data storage units 125. Logical volume manager 145 is responsible for functionally managing and distributing data transfer operations to various data storage units 125 of particular target data storage volumes 150. The operation of logical volume manager 145, like the operation of a storage system manager 118, is transparent to applications 135 executed directly by computer systems 105 or by clients of computer systems 105.

Virtual Machine System

Figure 1C:
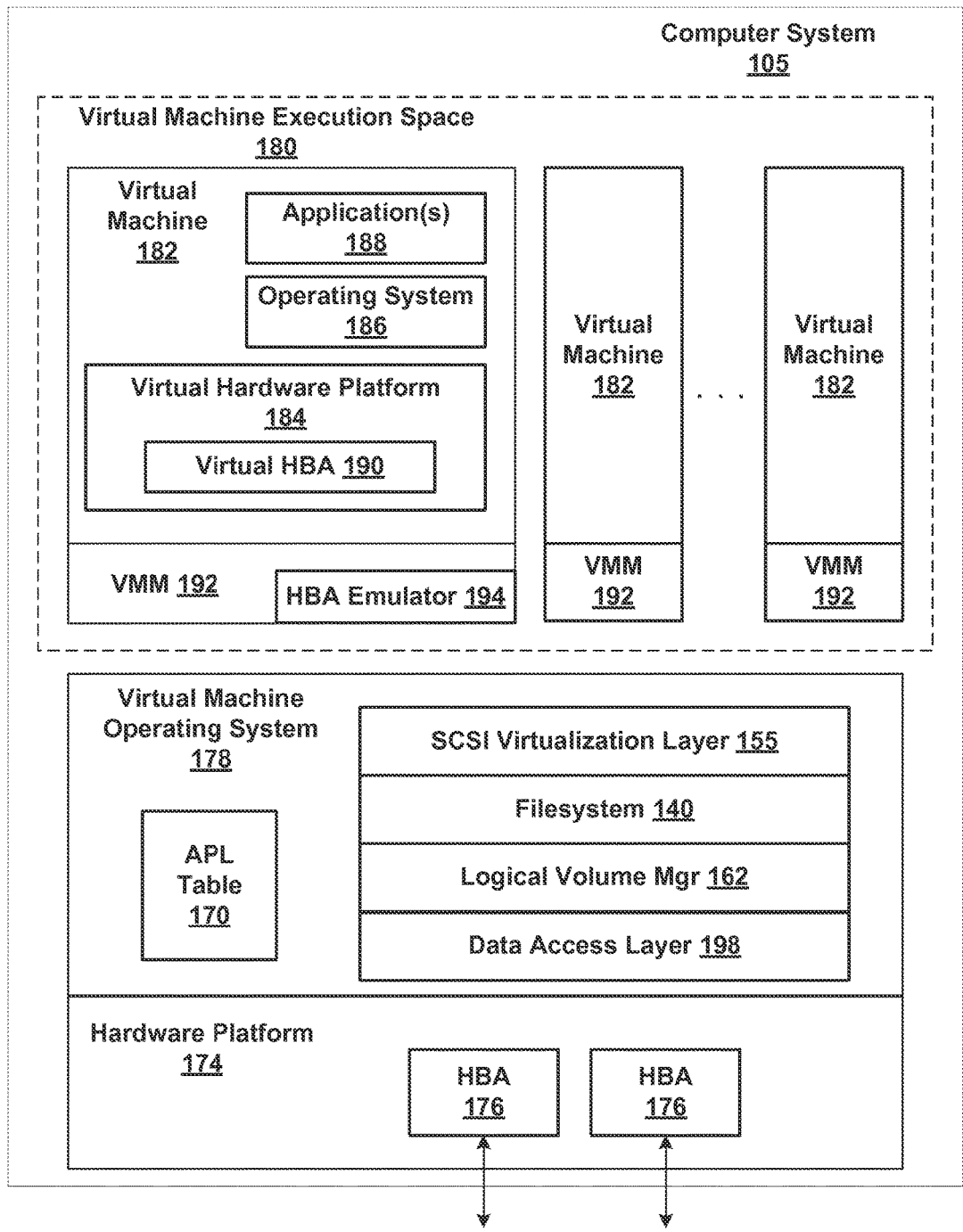
FIG. 1C is a block diagram illustrating a virtual machine based system configured to implement one or more embodiments of the invention.

FIG. 1C is a block diagram illustrating a virtual machine based system that is configured to implement one or more embodiments of the invention. A computer system 105 is constructed on a conventional, typically server-class hardware platform 174, including host bus adapters (HBA) 176 in addition to conventional platform processor, memory, and other standard peripheral components (not separately shown). HBAs 176 connect to storage systems 110 through network connections, e.g., redundant switches 112. Within the server, above HBAs 176, storage access abstractions are characteristically implemented through a series of software layers, beginning with a low-level SCSI driver layer (not shown) and ending in an operating system specific filesystem layer in operating system 178. The driver layer enables basic access to the target ports and data storage units 125. A data access layer 198 may be implemented above the device driver to support multipath consolidation of data storage units 125 visible through HBAs 176 and other data access control and management functions.

Hardware platform 174 is used to execute a virtual machine (VMKernel) operating system 178 supporting a virtual machine execution space 180 within which virtual machines (VMs) 182 are executed. Virtual machine operating system 178 and virtual machines 182 may be implemented using an ESX Server virtualization product manufactured and distributed by VMware, Inc. of Palo Alto, Calif. Note that embodiments of the invention exist which do not require use of the ESX Server product and, further embodiments exist which do require use of a virtualized computer system architecture.

In summary, virtual machine operating system 178 provides the necessary services and support to enable concurrent execution of virtual machines 182. In turn, each virtual machine 182 implements a virtual hardware platform 184 that supports the execution of a guest operating system 186 and one or more client application programs 188. Guest operating systems 186 maybe instances of Microsoft Windows, Linux and Netware-based operating systems. Other guest operating systems can be used. In each instance, guest operating system 186 includes a native filesystem layer, typically either an NTFS or ext3FS type filesystem layer. These filesystem layers interface with virtual hardware platforms 184 to access, from the perspective of guest operating systems 186, a data storage host bus adapter. In one embodiment, virtual hardware platforms 184 implement virtual HBA (host bus adapter) 190 that provides the appearance of the necessary system hardware support to enable execution of guest operating system 186.

Filesystem calls initiated by guest operating systems 186 to implement filesystem-related data transfer and control operations are processed and passed through virtual HBA 190 to adjunct virtual machine monitor (VMM) layers 192 that implement the virtual system support necessary to coordinate operation with virtual machine kernel 178. In particular, an HBA emulator 194 functionally enables the data transfer and control operations to be ultimately passed to HBAs 176. The system calls that implement the data transfer and control operations are passed to a virtual machine filesystem, such as filesystem 140, for coordinated implementation with respect to the ongoing operation of all of virtual machines 182. That is, the native filesystems of guest operating systems 186 perform command and data transfer operations against virtual SCSI devices. These virtual SCSI devices are based on emulated data storage units presented to the HBA emulator 194 by a SCSI virtualization layer 155. The virtual SCSI devices are actually maintained as files resident within the storage space managed by filesystem 140. Permitted guest operating system 186 command and data transfer operations against the virtual SCSI devices are mapped between the virtual SCSI devices visible to guest operating systems 186 and the data storage volumes visible to virtual machine filesystem 140. A further mapping is, in turn, performed by a virtual machine kernel-based logical volume manager 162 to data storage units 125 visible to logical volume manager 162 through data access layer 198, including device drivers, and HBAs 176.

One or more embodiments of the invention are generally applicable in computing environments where data storage volumes used by client computer systems are managed within a distributed storage system that supports typically automatic data replication operations. Accordingly, one environment for the implementation of one or more embodiments of the invention is in conventional storage area network (SAN) based data centers. From the following detailed description, however, those of ordinary skill in the art will readily understand that embodiments of the invention are not constrained to use in a particular environment, system or network architecture or by use of a particular operating system or set of data communications protocols. The following description is presented in the context of a data center application as illustrative of one embodiment of the invention for clarity of presentation and explanation.

File System Mapping

Figure 2A:
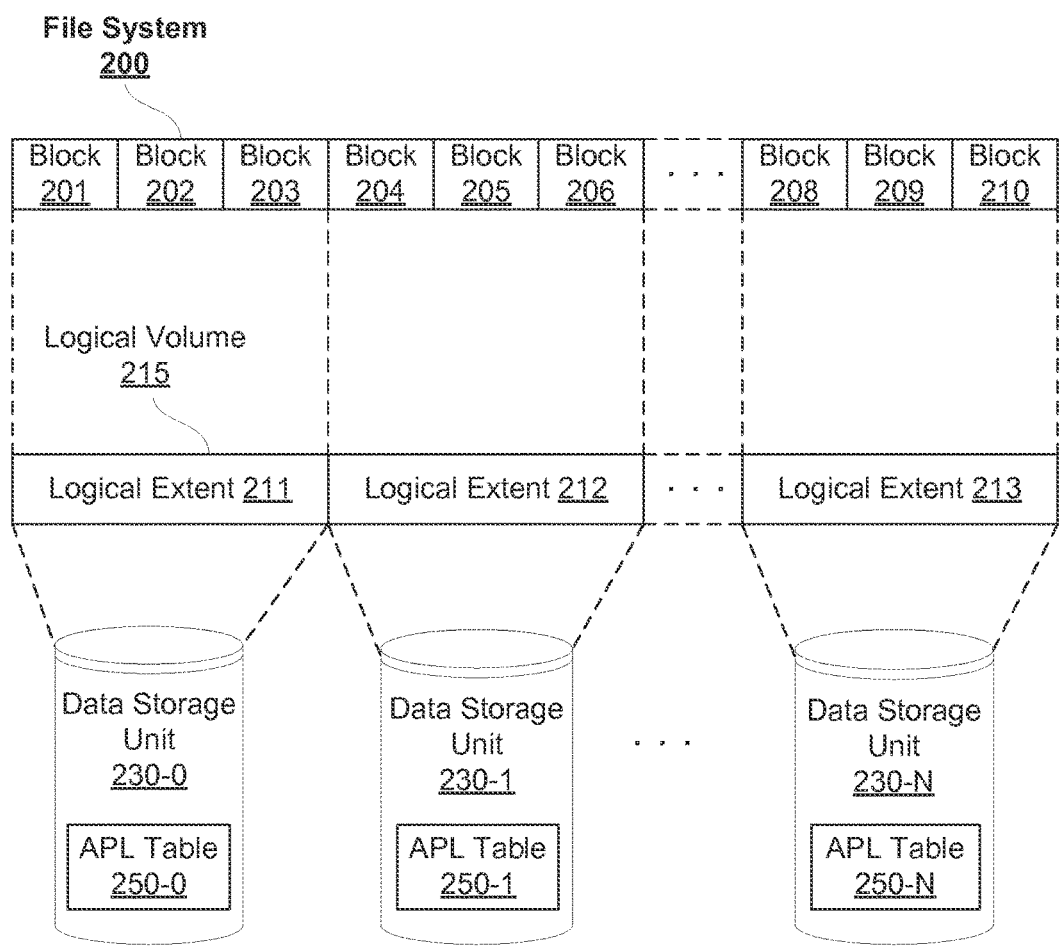
FIG. 2A is a conceptual diagram of a block mapping between a file system and logical volume and data storage units for the systems of FIGS. 1A, 1B, and 1C in accordance with one or more embodiments of the invention.

FIG. 2A is a conceptual diagram of a block mapping between a file system 200 and logic volume 215 for the systems of FIGS. 1A, 1B, and 1C, in accordance with one or more embodiments of the invention. Logical volume manager 145 aggregates data storage units 230-0 and 230-1 through 230-N into logical volume 215, with each data storage unit corresponding to a part of the logical volume, e.g., logical extents 211, 212, and 213. Logical extents 211 and 212 through 213 represent a single contiguous address space. File system 200 is an array of file blocks, 201, 202, 203, 204, 205, 206, 208, 209, and 210, where each block has a fixed size.

An APL table 250 (250-0 and 250-1 through 250-N) that is unique for each data storage unit 230 is stored and maintained for each one of data storage units 230. Each APL table 250 stores a different portion of the entries in APL table 170. Specifically, APL table 250-0 stores the entries of APL table 170 for file objects that are stored on data storage unit 230-0.

Figure 2B:
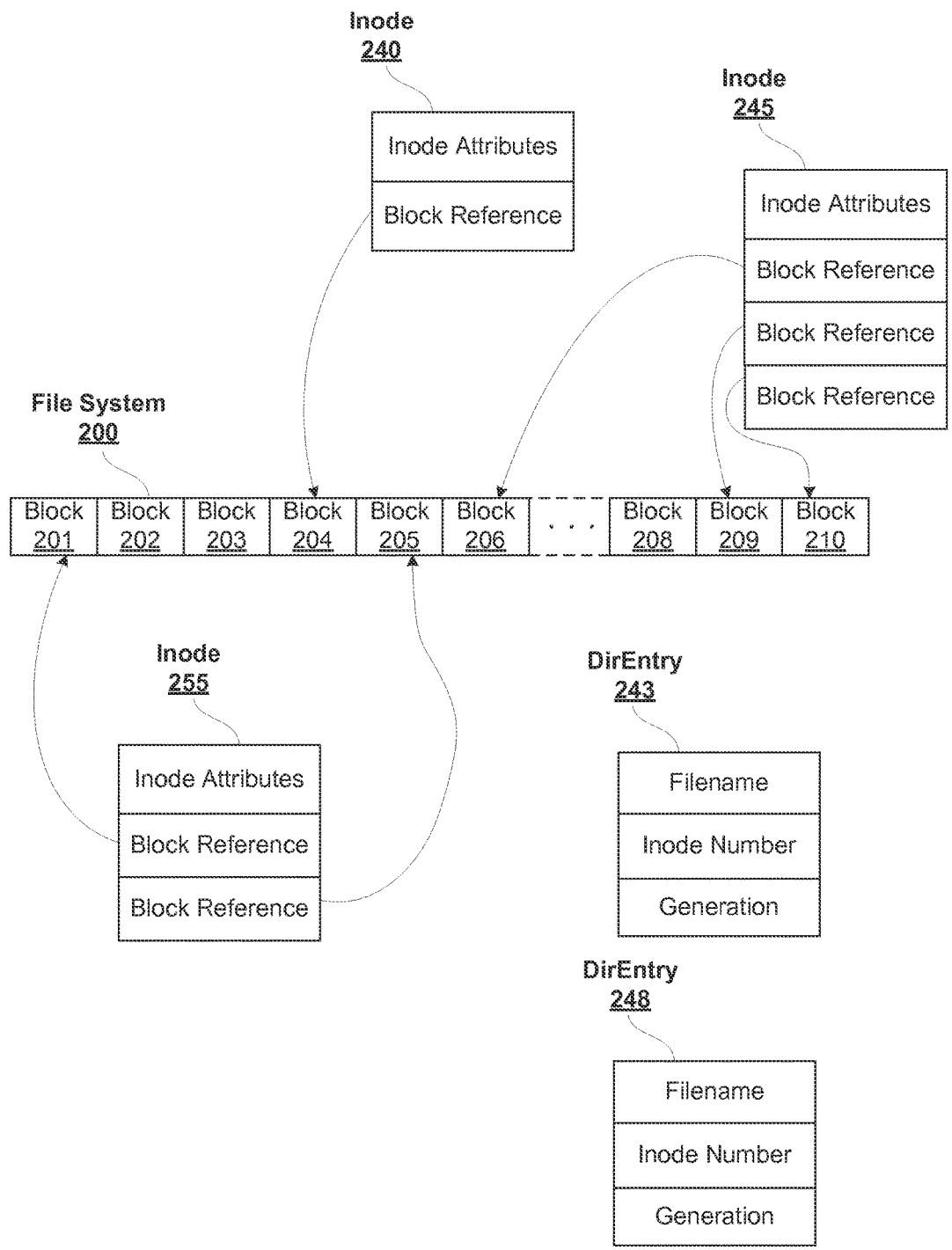
FIG. 2B is a conceptual diagram of the relationship between inodes of a file system in accordance with one or more embodiments of the invention.

FIG. 2B is a conceptual diagram of the relationship between file system 200, inodes 240, 245, 255, and directory entries (DirEntry) 243 and 248, in accordance with one or more embodiments of the invention. Each inode includes a pointer to one or more blocks of file system 200 that store file objects, e.g., directory entries or user data. For example, inode 255 includes a pointer to blocks 201 and 205; inode 240 includes a pointer to block 204; and inode 245 includes pointers to blocks 206, 209, and 210. Each inode further includes inode attributes, such as a unique inode number, length (number of storage units, e.g., blocks or bytes), type, generation number, link count, and the like. The inode number may be 64 bits and is the unique number of the inode corresponding to the file object in file system 200. The generation number may be 32 bits and is a monotonically increasing number that is incremented when a given file object's inode is reused for another file object. The link count indicates the number of file objects that link to the inode, such that a link count of zero indicates that the inode is no longer used and may be reused for another file object.

In general, blocks that are referenced by inodes may contain user data and/or directory entries. In the example given herein, it is assumed that blocks referenced by inodes 240, 245, and 255 are used to store directory entries, e.g., dirEntry 243 and 248, each of which stores a filename, which corresponds to a directory, an inode number, and a generation number.

Fully qualified filesystem paths (fullpath) provide an unambiguous manner of addressing objects on a hierarchical file system from an application. For example, open(/foo/bar/baz.txt) is a request to open the file object baz.txt in a directory called bar, which in turn is stored in a directory called foo. Directory foo is a directory in the root directory "/" of the volume. Fully qualified paths to directories or file objects may be referred to as dirpath and filepath, respectively.

The inodes shown in FIG. 2B illustrate how different inodes are traversed to access the file /foo/bar/baz.txt. For illustrative purposes, it is assumed that the root directory, "/" is hardcoded as inode 240, that dirEntry 243 corresponds to the "foo" directory, and that dirEntry 248 corresponds to the "bar" directory. Inode 240 points to block 204 and so the "foo" directory corresponding to dirEntry 243 is found somewhere in block 204. DirEntry 243 is then read to obtain its inode number. In this example, it is assumed that the inode number corresponding to inode 245 is stored in dirEntry 243 (foo). Blocks 206, 209, 210 that are referenced by inode 245 are then accessed to find the "bar" directory corresponding to dirEntry 248. DirEntry 248 is then read to obtain its inode number. In this example, it is assumed that the inode number corresponding to inode 255 is stored in dirEntry 248 (bar). Blocks 201, 205 that are referenced by inode 255 are then accessed to find the file object "baz.txt."

Referring to FIG. 2A, note that as the path is traversed, blocks are read from different data storage units 230. If data storage unit 230-1 is unavailable, then block 204 cannot be read, and the path to file object baz.txt is broken, even when the data storage unit where baz.txt is stored (data storage unit 230-0) is available. Similarly, if data storage unit 230-N is unavailable, then block 209 cannot be read, and the path to file object baz.txt is broken. As described further herein, use of APL tables 250 prevents failures in the prefix portion of the path for baz.txt, e.g., "/", "/foo", or "/foo/bar," from making baz.txt unavailable, as long as data storage unit 230 that stores baz.txt is available. When APL tables 250 are used, file objects stored on one of data storage units 250 can be accessed even if only that one data storage unit 230 is available.

Alternate Path Lookup Table

FIG. 3A is a diagram of an APL table 300, in accordance with one or more embodiments of the invention. As previously described, portions of APL table 300 are stored in APL tables 250. APL table 300 is created as a data structure that is maintained by the filesystem driver directly as part of filesystem 140 metadata or it is maintained by a separate entity and is available to the filesystem driver through interface functions. In one embodiment of the invention, APL table 300 is maintained as a set of file objects on the filesystem volume that it services. APL table 300 is a logical array of entries, with each entry containing the following fields: length, index number, path, and OID (object identifier).

A first entry in APL table 300 for path /foo includes length 311, index number 314, and OID 317. A second entry in APL table 300 for path /foo/bar includes length 312, index number 315, and OID 318. A third entry in APL table 300 for path /foo/bar/baz.txt includes length 313, index number 316, and OID 319. APL table 300 may include an entry for each file object in filesystem 140 or APL table 300 may only include entries for selected file objects or selected data storage units 230.

Length is the length (in bytes) of the record (table entry). In one embodiment of the invention, this is a 32-bit field. In other embodiments of the invention, this field is not present in the entry (each APL entry is a fixed width). Index number is an integer unique among all the entries stored in APL table 300. Index number is a primary key of the entry and may be a 64-bit number. Path is a fullpath to a file object, e.g., /foo, /foo/bar, /foo/bar/baz.txt, and the like. Since operating systems have an upper limit on fullpath length, say FS_MAX_PATH_LENGTH, this is a field of FS_MAX_PATH_LENGTH bytes in one embodiment. For example, on Unix-like operating systems, the upper limit on the fullpath length is 4096 bytes. In other embodiments of the invention, the fullpath length is variable length, and each tuple contains yet another field called length. For fixed length paths, the length field is optional since it is implicit.

Filesystem drivers typically manage and locate objects, e.g., file objects, symlinks, hardlinks, and the like, in memory and on disk by using binary values called object identifiers (OID). Unlike a filename or a file path which are ambiguous (the same name/path could refer to different objects at different points in time), the OID is unique per file object for the lifetime of the file system, even after said file object is removed from filesystem 140. The OID typically encodes enough information for the driver to able to read/write the object from/to the logical extent 211, 212, or 213 representing data storage units 230. A given object's OID is also unique across all file systems, especially for distributed and clustered file systems.

OID is OIDof(fullpath) and in some embodiments of the invention it is 28 bytes. An example OID consists of 3 values: the inode number, generation number, and UUID. The inode number may be 64 bits and is a unique number of an inode corresponding to a file object in a filesystem volume. The generation number may be 32 bits and is a monotonically increasing number that is stored in the inode. The generation number is incremented when a given file object's inode is reused for another file object. The UUID may be 128 bits and is a unique identifier for filesystem 140, i.e. a file system identifier. The UUID distinguishes a given filesystem volume from other filesystem volumes visible to the computer on which the filesystem driver is running.

In some cases user data or directory entries corresponding to a file object may be stored in multiple blocks allocated to the inode of said file object and some of the blocks may be stored in different data storage units 230. For example, directory entries may be stored in blocks 206 and 209 of directory inode 245 of FIG. 2B, and physically stored in data storage units 230-1 and 230-N, respectively. A DSUof(OID) command returns all of the data storage units 230 in which the inode attributes and data blocks of the file object corresponding to OID are stored. Therefore, when a file object is stored in a single data storage unit 230, a single data storage unit identifier is returned. When a file object is stored on multiple data storage units 230, multiple data storage unit identifiers are returned.

Filesystem 140 is augmented according to known methods to include new commands. These commands are used to create, access, and maintain APL table 300. An apl_lookup (DSU, fullpath) command finds an entry in the APL table 250 of the specified DSU whose path field matches fullpath, and, if found, returns the OID field. For example, apl_lookup(DSU230-0, /foo/bar) returns OID 318. An apl_insert (DSU, fullpath, OID) command creates a new entry in APL table 300 and in the APL table 250 of the specified DSU, sets the path and OID fields to fullpath and OID, respectively. An apl_delete(DSU, fullpath) command executes an apl_lookup (DSU, fullpath) command, and if an OID is returned, the entry is deleted from APL table 300 and APL table 250 of the specified DSU. An apl_rename command(DSU, srcfullpath, dstfullpath) executes an apl_lookup(DSU, srcfullpath) and if an OID is returned, dsfullpath is placed in the path field for the entry.

In some embodiments of the invention, APL table 300 is implemented as a B+ tree that is indexed by hash(DSU, fullpath). Inserting an entry in APL table 300 is performed by inserting an entry at a position determined by hash(DSU, fullpath). Similarly, deleting an entry from the B+ tree is performed by deleting an entry at a position determined by hash(DSU, fullpath), when the path field in the entry matches fullpath. Similarly, the DSU 230 specific APL table 250 is implemented as a B+ tree that is indexed by hash (fullpath).

The size of the path field may be reduced by storing path prefixes instead of fullpath names. The prefixes may be generated and referenced when new entries are inserted into APL table 300. A path prefix is a part of a fullpath, e.g., /foo is a path prefix for /foo/bar and /foo/bar is a path prefix for /foo/bar/baz.txt. When APL table 300 contains the second entry (path=/foo/bar) the entry for /foo/bar/baz.txt can be represented as <i2>/baz.txt, where <i2> is the index number of the entry containing /foo/bar, i.e., index number 315.

Figure 3B:
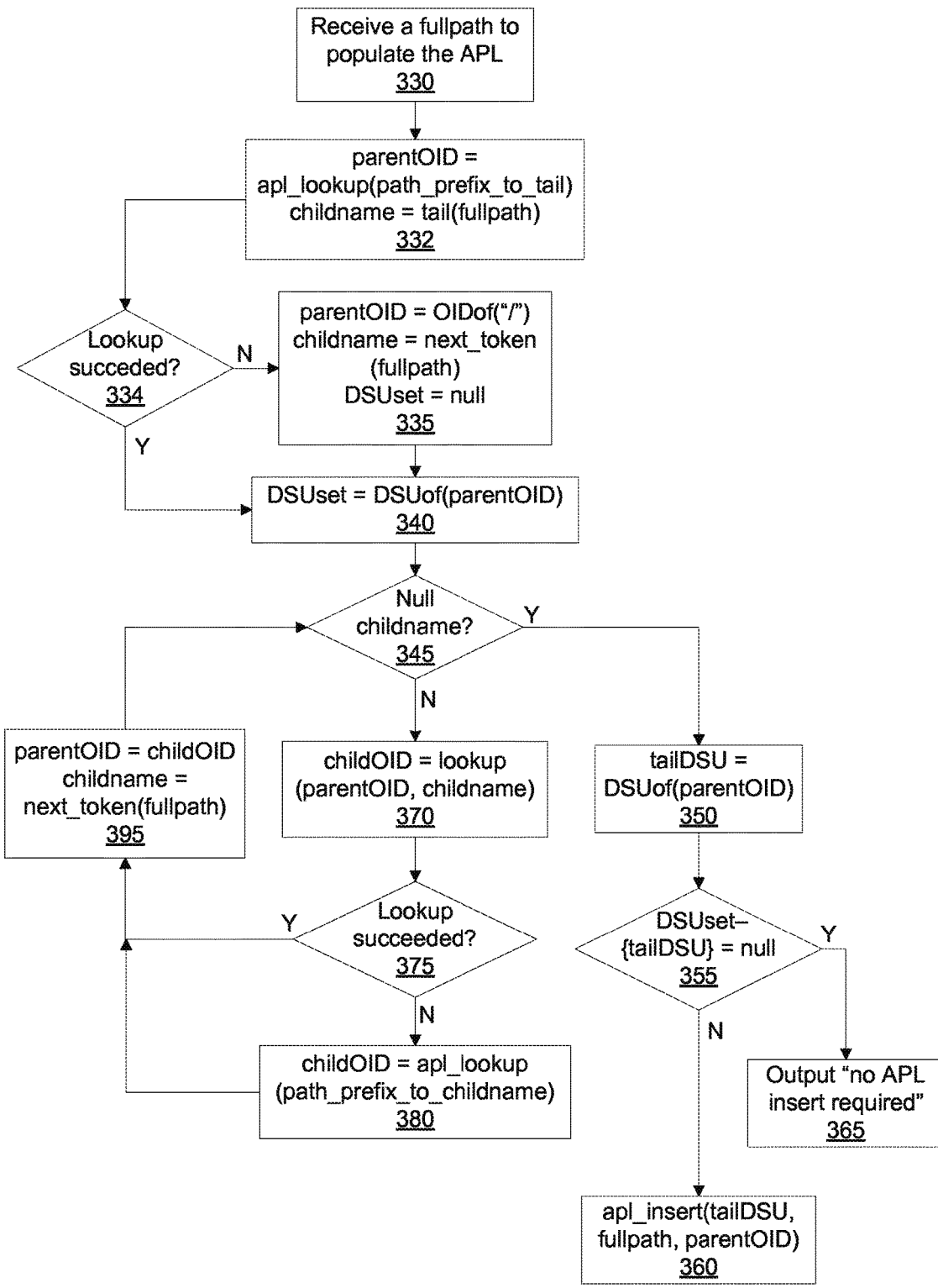
FIG. 3B is a flow diagram of method steps for populating an APL table in accordance with one or more embodiments of the invention.

FIG. 3B is a flow diagram of method steps for populating APL table 300, in accordance with one or more embodiments of the invention. As previously described, APL table 300 represents the combination of APL tables 250-0, 250-1, . . . , 250-N. A complete APL table 300 may be stored on computer system 105 and portions of APL table 300 may be cached. When different components of a fullpath straddle a data storage unit 230 boundary, the last component of the fullpath (the tail) can be available when one or more data storage units 230 are unavailable by adding an entry in the APL table that is stored on the data storage unit 230 that stores the tail. In other words, each entry in APL table 300 represents a tail inode that does not rely on traversing intermediate inodes that reside on other data storage units 230.

Fully populated APL table 250-i for data storage unit 230-i contains entries leading to all inodes that are stored on data storage unit 230-i. In the illustration provided herein, APL table 250-0 includes an entry for inode 255; APL table 250-1 includes an entry for inode 240; and APL table 250-N includes an entry for inode 245. Thus, APL table 250-0 does not include entries for inodes 240 and 245; APL table 250-1 does not include entries for inodes 255 and 245; and APL table 250-N does not include entries for inodes 255 and 240. APL table 300 is highly scalable since there is only a single entry for each file object. In contrast, when mirroring is used to improve file object availability the entire contents of each data storage unit 230 is replicated. Furthermore, the availability of an inode on a mirrored DSU 230 is still dependent on the availability of other DSUs 230 that contain inodes making up the path prefix for said inode. Therefore, mirroring does not solve the inter-DSU dependency problems of path availability because the inode corresponding to one or more of a file's path components may not be available.

In step 330 filesystem 140 receives a fullpath that is used to populate APL table 300, e.g., fullpath=/foo/bar/baz.txt. First, filesystem 140 determines if the path is already stored in APL table 300. In step 332 the value of a variable called parentOID is computed according to one or more embodiments of the invention, using the apl_lookup command with the portion of the fullpath to the tail component, path_prefix_to_tail as the input to APL table 300. The value of another variable called childname is set to the tail. The path_prefix_to_tail of /foo/bar/baz.txt is /foo/bar and the tail is baz.txt. In step 334 filesystem 140 determines if the lookup operation succeeded, and, if so, an entry for the fullpath exists in APL table 300 and filesystem 140 proceeds to step 340. Otherwise, filesystem 140 proceeds to step 335 to check if other prefixes of the fullpath have entries in APL table 300 and resolves them using the conventional method if no such entries exist.

In step 335 the OID of the root directory is determined using the OIDof command, e.g., OIDof("/") and stored as parentOID. For example, OIDof("/") in the filesystem layout from FIG. 2B will return the OID of inode 240. The value of childname is determined using a next_token command to find the next component of the fullpath. For example, childname of /foo/bar/baz.txt is foo. DSUset is initialized to null. In step 340 DSUset is a set variable and is initialized to DSUof(parentOID), e.g., data storage unit 230 that stores the inode for the root directory "/" (inode 240 and data storage unit 230-1).

In step 345 filesystem 140 determines if the childname is null, indicating that the file object specified by fullpath has been reached. When the childname is null, in step 350 filesystem 140 sets tailDSU to DSUof(parentOID). The tailDSU of the fullpath /foo/bar/baz.txt is DSUof(OIDof (baz.txt)) and the parent OID is OIDof(baz.txt). In step 355 the difference between DSUset and {tailDSU} is computed to determine if a data storage unit 230 boundary is straddled, and, if not then the difference is null, and in step 365 "no APL insert required" is output. If a data storage unit 230 boundary is straddled, then in step 360 an apl_insert command is executed using tailDSU, fullpath, and parentOID as inputs. The DSUset of the fullpath /foo/bar/baz.txt at step 345 will contain the DSUs of "/", "foo" and "bar", e.g. {230-1, 230-N, 230-0}.

If, in step 345 the childname is not null, then in step 370 filesystem 140 sets childOID to the result of a lookup command with the parentOID and childname as inputs. POSIX-like file systems support a standard set of operations. In the most general case, these operations work on file objects specified by using fullpath. Internally, the operations rely on resolving paths to OIDs. The most common operations implemented by the file system driver that are relevant to embodiments of the invention are: lookup, pathwalk, create, remove, and rename. The inputs to the lookup command are a directory OID and a filename. The OID of the file object of "filename" is returned if it exists as a child of the directory referenced by the directory OID. For example, lookup(OIDof("/"), foo) returns the OID of foo by reading the directory entries of the root directory "/" and returning the OID of foo.

In step 375 filesystem 140 determines if the lookup operation succeeded, and, if so, in step 395 parentOID is set to childOID and childname is set to the next component in fullpath, the next component being bar. Filesystem 140 then returns to step 345 to see if the last component in the path has been reached. In step 375, filesystem 140 determines that the lookup operation failed if the data storage unit 230 that stores the directory entry for foo is unavailable. When childOID is not a valid directory according to conventional path traversal, then in step 380 the childOID is computed according to the invention, using the apl_lookup command and filesystem 140 proceeds to step 395. When conventional path traversal is used, the childOID may not be a valid directory when one or more data storage units 230 have failed and prevented the path traversal from reaching a dirEntry for childname. The input to apl_lookup is path_prefix_to_childname (/foo), and the OID of path /foo from APL table 300 is returned, OID 317. When all of the data storage units 230 are available, APL table 300 and APL table 250 can be populated for each file object.

APL table 300 may be used to improve the namespace availability during the execution of other standard commands, such as pathwalk, create, remove, and rename. Pathwalk receives a fullpath as an input, traverses the path specified by fullpath component-by-component using the lookup command, and returns the OID of the last component of the path. For example, pathwalk(/foo/bar) returns OID 318. Create receives a directory OID (dirOID) and filename as inputs and creates a regular file, symlink, or other filesystem object in the directory referenced by dirOID. For example, create(OID 317,bar) creates the directory bar in the directory /foo and create(OID 318,baz.txt) creates the file object baz.txt in the directory /foo/bar.

The remove command receives a fullpath as an input and removes the object referred by fullpath from the file system. The rename command receives a source dirOID (srcdirOID), a source filename (srcfilename), a destination dirOID (dstdirOID), and a destination filename (dstfilename) as inputs and renames srcfilename in the directory referred by srcdirOID to dstfilename in directory referred by dstdirOID. For example, rename(OID 318, baz.txt, OID 318, vmw.txt) renames /foo/bar/baz.txt to /foo/bar/vmw.txt.

The commands that are visible to a user include create, remove, and rename. However, the user versions of these commands do not require OIDs as inputs. Specifically, the user visible create command receives a path (dirpath) and filename as inputs. Therefore, create is internally implemented using pathwalk to determine dirOID, e.g., pathwalk (dirpath). Similarly, pathwalk is used to determine srcdirOID and dstdirOID for the user visible rename command which receives two inputs, a source fullpath (srcfullpath) and a destination fullpath (dstfullpath). Execution of the pathwalk command, including use of APL table 300, is described in conjunction with FIGS. 4A and 4B.

Figure 3C:
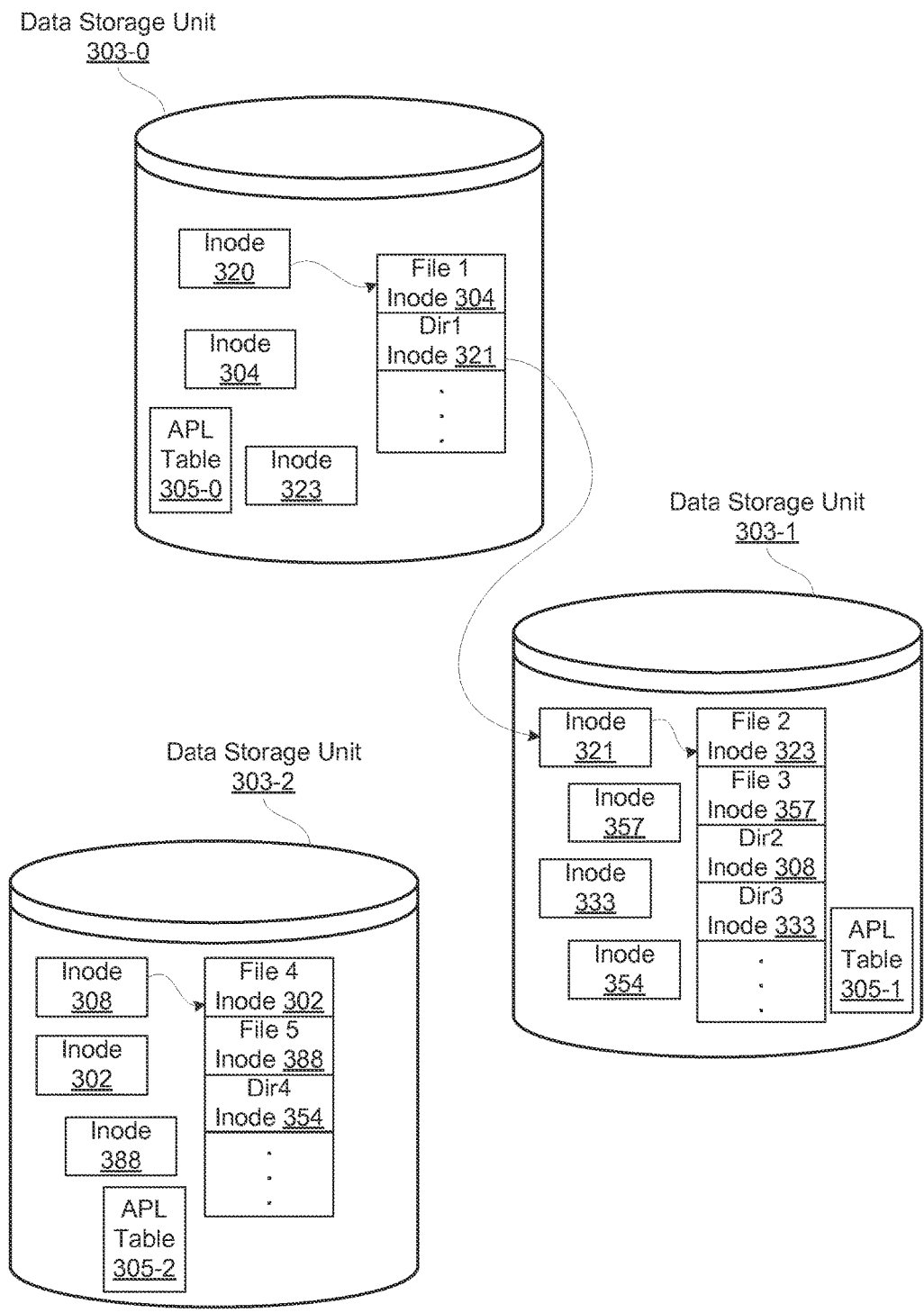
FIG. 3C is a conceptual diagram illustrating the contents of data storage units in accordance with one or more embodiments of the invention.

FIG. 3C is a conceptual diagram illustrating the contents of data storage units 303, in accordance with one or more embodiments of the invention. The blocks allocated to inodes 304, 320, and 323 are stored in data storage unit 303-0. Inode 320 is hardcoded as the root directory. The blocks allocated to inodes 321, 357, 333, and 354 are stored in data storage unit 303-1. The blocks allocated to inodes 308, 302, and 388 are stored in data storage unit 303-2. Each data storage unit 303 stores a unique APL table 305. APL table 305-0 is stored on data storage unit 303-0 and includes entries for one or more file objects (directories or user data) that are stored on data storage unit 303-0. Likewise, APL table 305-1 is stored on data storage unit 303-1 and includes entries for one or more file objects that are also stored on data storage unit 303-1 and APL table 305-2 is stored on data storage unit 303-2 and includes entries for one or more file objects that are also stored on data storage unit 303-2.

When a user executes create(/Dir1/Dir2, foo) the pathwalk command is executed to obtain the OID for Dir2. Specifically, lookup(lookup(OIDof(/),Dir1, Dir2) is executed to traverse the /Dir1/Dir2 path. The root directory specified by inode 320 is read to find Dir1. Dir1 is stored in Inode 321 which is stored on data storage unit 303-1. If data storage unit 303-1 is unavailable, the lookup command fails since the directory entries of inode 321 cannot be read, causing the pathwalk and create commands to fail as well. The unavailability of data storage unit 303-1 has prevented the creation of the file object foo on data storage units 303-0 or 303-2 which may be available. Similarly, if data storage unit 303-0 is unavailable, the root directory cannot be read and the lookup command fails, regardless of whether or not data storage units 303-1 and 303-2 are available.

The use of APL tables 305 instead allows for the creation of the file object foo on data storage unit 303-2 even if data storage units 303-0 and 303-1 are unavailable. If the conventional lookup command fails, apl_lookup is used. In this example, apl_lookup(/Dir1/Dir2) returns the OID of Dir2, i.e. inode 308, which is stored in APL table 305-2. The create command does not fail and instead the foo file object is created on data storage unit 230-2. Note that the entire path prefix may be read from APL table 305-2 using a single read access, rather than traversing each component of the path prefix as is done using the conventional lookup command. An entry may be added to APL table 305-2 for the path /Dir1/Dir2/foo when the create command is executed or at a later time as a batch process using the pathwalk command.

The Pathwalk Command

Figure 4A:
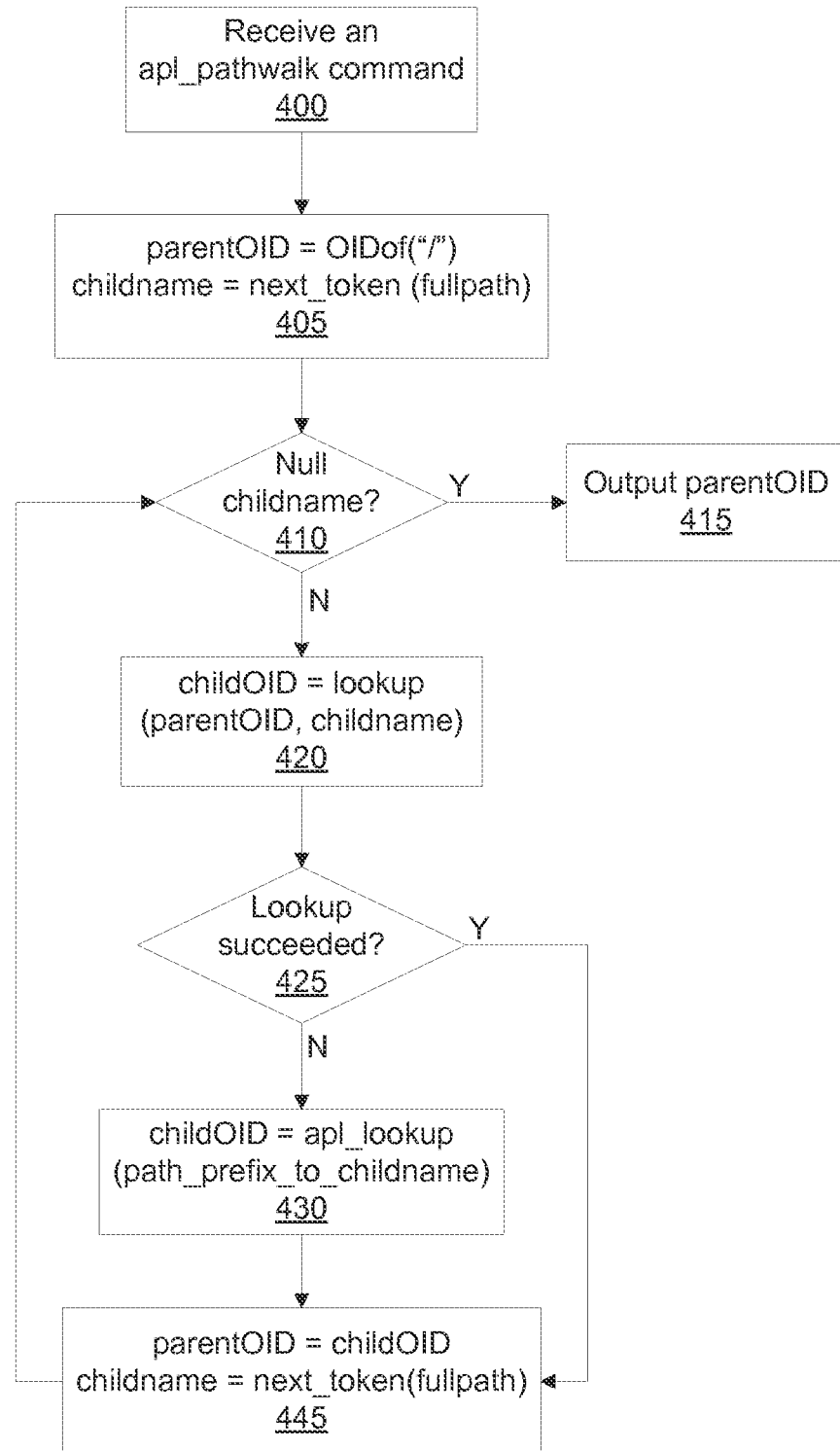
FIG. 4A is a flow diagram of method steps for executing a pathwalk command in accordance with one or more embodiments of the invention.

FIG. 4A is a flow diagram of method steps for executing the pathwalk command using APL table 300, in accordance with one or more embodiments of the invention. In step 400 filesystem 140 receives an apl_pathwalk command with a fullpath input, e.g., apl_pathwalk(/foo/bar/baz.txt). In step 405 filesystem 140 determines the parentOID using OIDof ("/") and determines the childname as the next component in the fullpath using next_token(fullpath). For the fullpath /foo/bar/baz.txt the parentOID is the OID of the root directory "I" and the childname is foo. In step 410 filesystem 140 determines if the childname is null, indicating that the file object specified by fullpath has been reached. When the childname is null, in step 415 filesystem 140 outputs parentOID. When the childname is not null, in step 420 the childOID is determined using the lookup command, e.g., lookup(parentOID, childname). For the fullpath /foo/bar/baz.txt, the lookup command inputs are (/,foo).

In step 425 filesystem 140 determines if lookup succeeded. If lookup succeeded in step 425, the filesystem 140 proceeds to step 445. In step 425 lookup fails when the data storage unit that stores the directory entry for childname is unavailable. When lookup fails according to conventional path traversal, then in step 430 the childOID is computed according to the invention, using the apl_lookup command and filesystem 140 proceeds to step 445. The inputs to apl_lookup are path_prefix_to_childname (/foo) and the OID of path /foo from APL table 300 is returned, OID 317. In step 445 parentOID is set to childOID and childname is set to the next component in fullpath (bar). Filesystem 140 then returns to step 410 to see if the last component in the path has been reached.

Figure 4B:
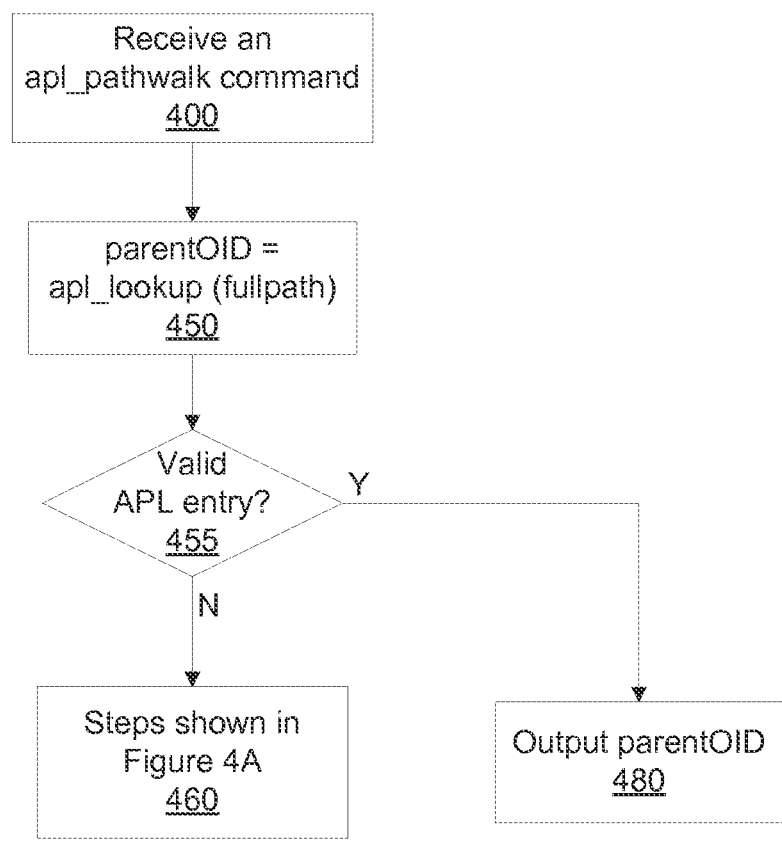
FIG. 4B is another flow diagram of method steps for executing a pathwalk command in accordance with one or more embodiments of the invention.

FIG. 4B is another flow diagram of method steps for executing the pathwalk command using APL table 300, in accordance with one or more embodiments of the invention. In step 400 filesystem 140 receives an apl_pathwalk command with a fullpath input, e.g., apl_pathwalk(/foo/bar/baz.txt). Rather than using conventional path traversal, the apl_lookup command is used to quickly traverse the path. In step 450 filesystem 140 determines the parentOID using apl_lookup(fullpath). In step 455 filesystem 140 determines if apl_lookup command succeeded, and, if so, then in step 480 filesystem 140 outputs the parentOID.

In step 450 apl_lookup fails if there is not a valid entry in APL table 300 for the fullpath. If, in step 455 filesystem 140 determines that apl_lookup failed, then the filesystem 140 attempts a slower conventional lookup by proceeding to step 460. In step 460 filesystem 140 completes the previously described steps that are shown in FIG. 4A (steps 400, 405, 410, 415, 420, 425, 430, and 445).

The Create Command

Figure 5A:
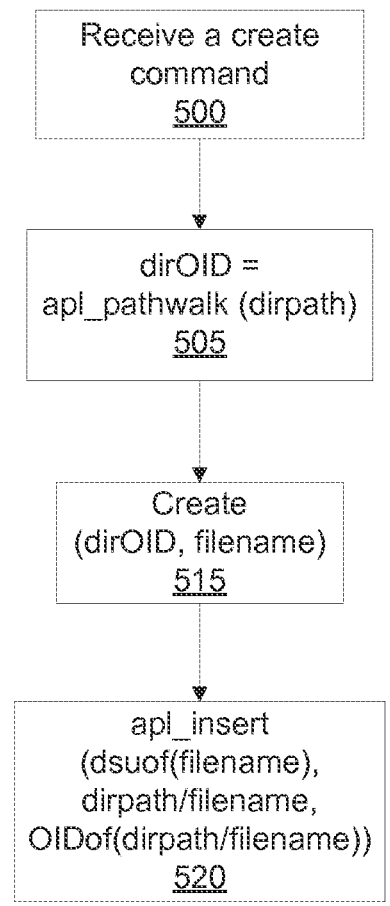
FIG. 5A is a flow diagram of method steps for executing a create command in accordance with one or more embodiments of the invention.

FIG. 5A is a flow diagram of method steps for executing a create command, in accordance with one or more embodiments of the invention. In step 500 filesystem 140 receives a create command with dirpath and filename inputs, e.g., create(dirpath,filename), where dirpath/filename is a full-path for a file object. In step 505 filesystem 140 determines the dirOID using apl_pathwalk with dirpath as an input. For the input of /foo/bar apl_pathwalk returns the OID of /foo/bar, OID 318. In step 515 filesystem 140 executes a create command with dirOID and filename as inputs to create the file object of filename. By using apl_pathwalk to determine dirOID the valid dirOID is obtained even when data storage units storing intermediate directories, e.g., / and /foo, are unavailable. In step 520 filesystem 104 filesystem 140 executes an apl_insert command with dsuof(filename), dirpath/filename and OIDof(dirpath/filename) as inputs to populate an entry for the path in the APL table on the data storage unit 230 that stores filename.

It may not be important to protect all objects in the file system hierarchy. For example, it is not important to maintain high availability to temporary file objects made by an application such as a web browser. For such file objects, the overhead (even if it is small) of a populating an APL entry during file create may not be worthwhile. In general, file systems may mark certain directories to be "unprotected" by the APL mechanism. Some examples of directories that may not be selected for protection are c:\windows\temp on Windows operating systems or /tmp on Unix-like operating systems. Additionally, rather than populating an APL entry at file create time, a background helper process may be implemented to populate new entries in the APL tables that are queued as a result of create command execution. The downside of queuing the population of new entries is that the availability of the newly created file object in the file system hierarchy is reduced if a data storage unit becomes unavailable between the time the file object is created and the APL table entry for the file object is populated. However, batching the population of multiple entries may result in better storage performance since fewer accesses may be needed for each data storage unit.

Figure 5B:
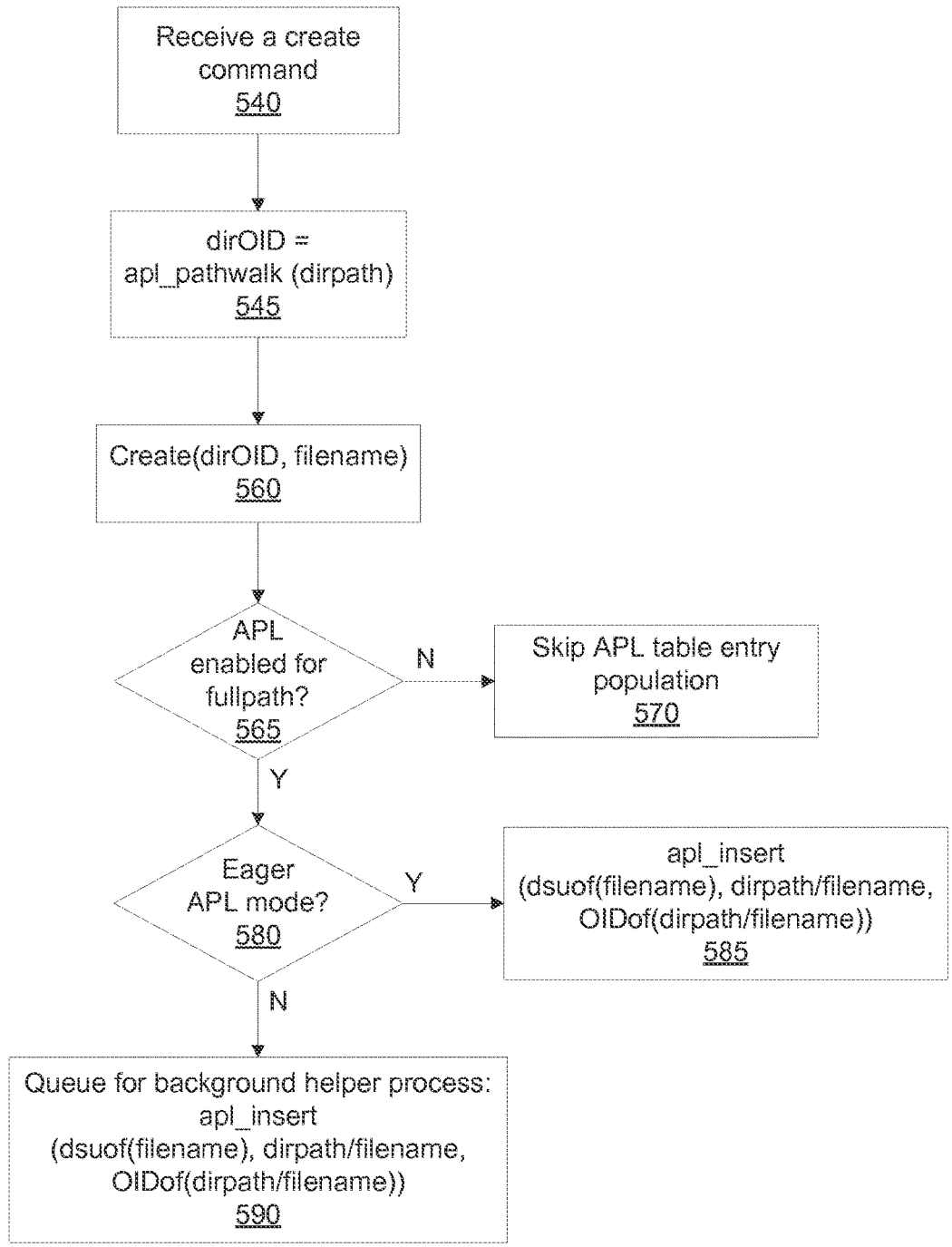
FIG. 5B is another flow diagram of method steps for executing a create command in accordance with one or more embodiments of the invention.

FIG. 5B is another flow diagram of method steps for executing a create command, in accordance with one or more embodiments of the invention. Steps 540, 545, 560, and 585 correspond to steps 500, 505, 515, and 520 of FIG. 5A, respectively, and are completed as previously described. In step 565 filesystem 140 determines if APL population is enabled for dirpath, and, if not, in step 570 an entry is not populated in APL table 300 or any of APL tables 250.

If, in step 565 filesystem 140 determines that APL population is enabled for dirpath/filename (fullpath), then in step 580 filesystem 140 determines if an "eager" APL table population mode is enabled. The eager mode indicates whether or not to populate an entry at the time that a create command is executed. When the eager mode is not enabled, a lazy APL table population mechanism is used, i.e., the previously described background helper process. If, in step 580 filesystem 140 determines that the eager APL table population mode is enabled, then in step 585 filesystem 140 executes an apl_insert command with DSUof(filename), dirpath/filename and OIDof(dirpath/filename) as inputs to populate an entry for the path in the APL table on the data storage unit 230 that stores filename. Otherwise, in step 590 filesystem 140 queues an APL table entry for insertion to APL table 300 and the DSU APL table 250 by the background helper process.

The Delete Command

Figure 6:
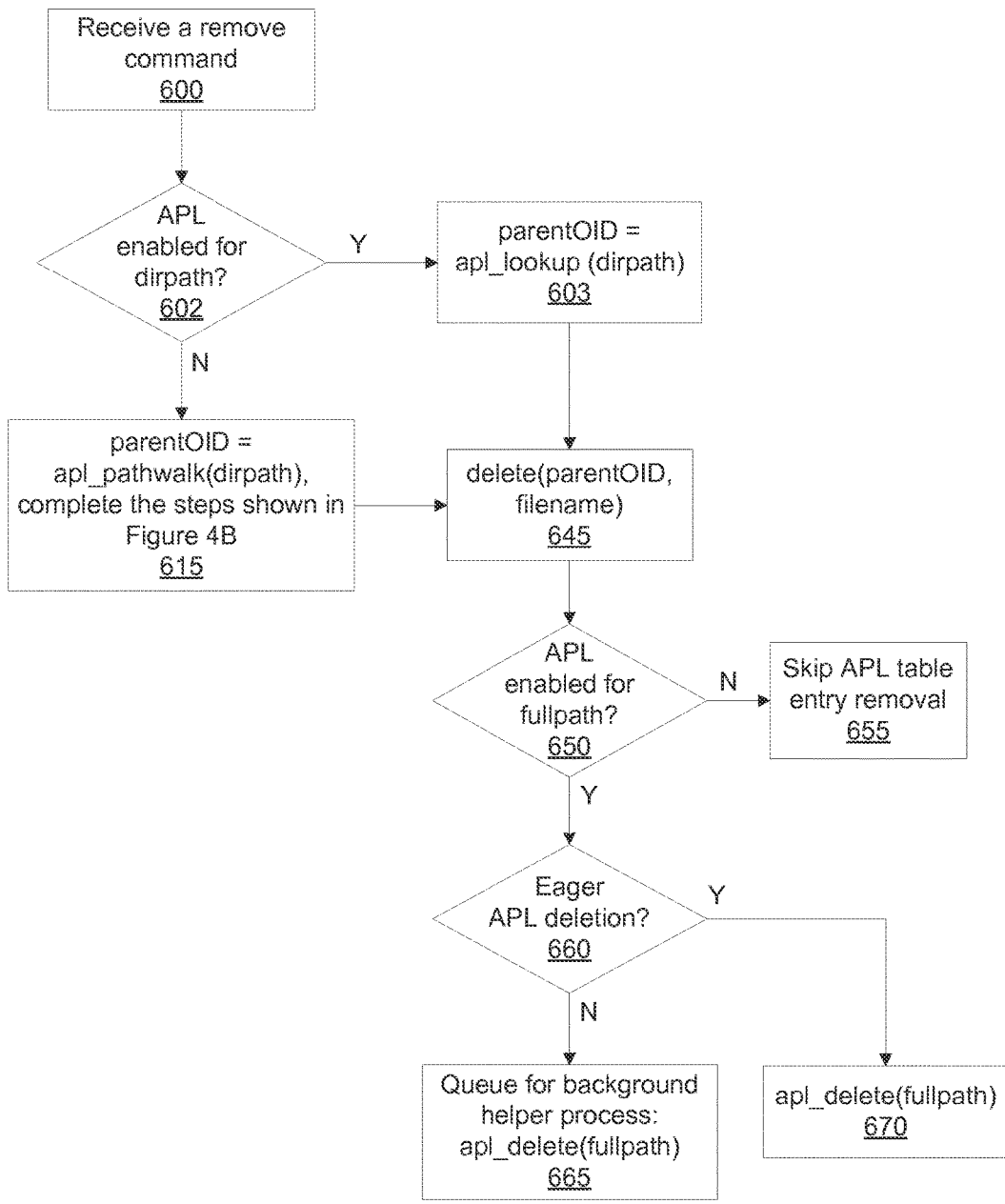
FIG. 6 is another flow diagram of method steps for executing a remove command in accordance with one or more embodiments of the invention.

FIG. 6 is a flow diagram of method steps for executing a delete command, in accordance with one or more embodiments of the invention. When deleting an existing object, the filesystem 140 removes the corresponding entry from the APL table 250 of the data storage unit 230 on which the inode of the object is located. OIDs have a generation number that is used to detect stale OIDs. It is possible to not delete APL table entry 250 when the corresponding file object is unlinked since a subsequent APL table lookup will return a false positive, and filesystem 140 will subsequently refuse to use the file object because the generation number in the OID from the APL table entry 250 does not match the generation number of the corresponding inode on the data storage unit 230. Again, like the create command, it is possible to eagerly delete entries in APL tables 230 or to queue the entries for deletion. It is also possible to never delete APL table entries, however it may be desirable to reuse the invalid entries to store new, valid entries.

In step 600 filesystem 140 receives a remove command with a dirpath and filename inputs where filename is the file object to be removed from the directory referenced by dirpath. In step 602 filesystem 140 determines if APL population is enabled for the dirpath, and, if so, in step 603 filesystem 140 determines the parentOID using apl_lookup to obtain the OID of the fullpath prefix (dirpath), OIDof(/foo/bar) for the fullpath /foo/bar/baz.txt, and proceeds to step 645. If, in step 602 filesystem 140 determines that APL population is not enabled for the dirpath, then filesystem 140 proceeds to step 615. In step 615 filesystem 140 executes an apl_pathwalk command using the dirpath input to determine the OID of the dirpath and store it in parentOID, parentOID=apl_pathwalk(dirpath). In step 615 filesystem 140 completes the previously described steps that are shown in FIG. 4B (steps 400, 450, 455, 460, and 480) before proceeding to step 645. For the fullpath /foo/bar/baz.txt the parentOID is the OIDof(/foo/bar).

In step 645 the delete command is executed to delete the file object indicated by the filename. In step 650 filesystem 140 determines if APL population is enabled for the fullpath (dirpath/filename), and, if not, in step 655 an entry is not deleted in APL table 300 or any of APL tables 250. If, in step 650 filesystem 140 determines that APL population is enabled for the fullpath, then in step 660 filesystem 140 determines if an "eager" APL table deletion mode is enabled. The eager APL deletion mode indicates whether or not to delete an entry at the time that a remove command is executed. When the eager deletion mode is not enabled, a lazy APL table deletion mechanism is used, i.e., the previously described background helper process. If, in step 660 filesystem 140 determines that the eager APL table deletion mode is enabled, then in step 670 filesystem 140 executes an apl_delete command with fullpath as an input to delete an entry for the path in the APL table on the data storage unit that stores the path matching fullpath. Otherwise, in step 665 filesystem 140 queues deletion of an APL table entry for processing by the background helper process.

The Rename Command

Figure 7:
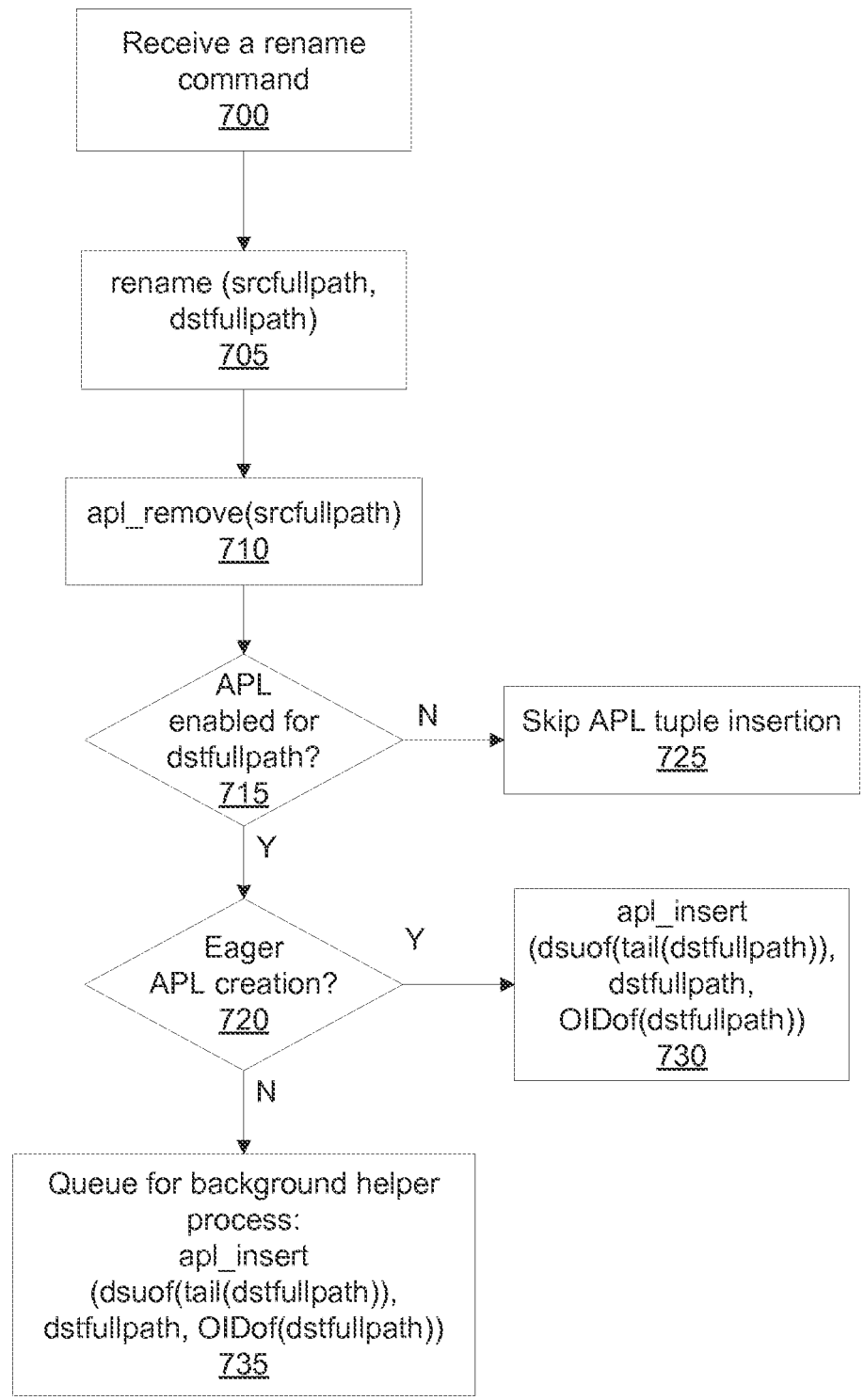
FIG. 7 is a flow diagram of method steps for executing a rename command in accordance with one or more embodiments of the invention.

FIG. 7 is a flow diagram of method steps for executing a rename command in accordance with one or more embodiments of the invention. When a component of any path is renamed, it is necessary to search for all APL table entries in all data storage units 230 of data storage volumes 215 and replace the old component name with new component name. This operation can be completed more efficiently when APL tables 300 and 250 use indexing based on path prefixes, as previously described. When path prefixes are used, only the entry that matches the path being renamed needs to be replaced. All other subtrees of the renamed path are implicitly updated because they hold an index reference to this path instead of a verbose reference. When path prefixes are not used multiple entries in one or more APL tables 250 may need to be modified. Since APL tables 300 and 250 are capable of withstanding duplicate entries because the indexing mechanism will resolve a fullpath to a relevant entry, in the worst case, the OID in the entry will be stale with respect to the generation number in the inode, and the entry can be ignored or discarded.

In step 700 filesystem 140 receives a user visible rename command with the inputs srcfullpath and dstfullpath. In step 705 filesystem 140 executes the conventional rename command. In step 710 filesystem 140 executes the apl_remove command to remove the file object specified by srcfullpath. In step 715 filesystem 140 determines if APL population is enabled for the dstfullpath prefix, and, if not, in step 725 an entry in not populated in APL table 300 or any of APL tables 250.

If, in step 715 filesystem 140 determines that APL population is enabled for the dstfullpath prefix, then in step 720 filesystem 140 determines if the eager APL table population mode is enabled. If, in step 720 filesystem 140 determines that the eager APL table deletion mode is enabled, then in step 730 filesystem 140 executes an apl_insert command with dsuof(tail(dstfullpath)), dstfullpath, and OIDof(dstfullpath) as inputs to insert an entry for the path in the APL table on the data storage unit that stores the path matching fullpath. Otherwise, in step 735 filesystem 140 queues insertion of an APL table entry for processing by the background helper process.

Unlike traditional hierarchical file system lookup, when APL tables are used filesystem 140 is capable of looking up the path in single access. The average storage I/O complexity of looking up a N-component fullpath using the traditional hierarchical file system method is:

$$1/2 \times \sum_{i=1}^{N-1} dirsize(i) + N \times inodesize$$

where dirsize(i) is the size of the list of dirEntries of the $i^{th}$ directory and inodesize is the size of a directory inode. In contrast, the average storage I/O complexity of looking up a N-component fullpath using an APL table implemented as a B+ tree for M data storage units is:

$$\frac{M}{2} \times \log_b(P) \times sizeof(treenode) + sizeof(APL\_table\_entry)$$

where b is the order of the B+ tree, P is the average number of entries in the APL table 250, treenode is a node in the B+ tree containing hash values for the tuple (DSU, fullpath), and APL_table_entry is an entry in the APL table 250. In one embodiment, treenode is comparable to inodesize, M is a small integer up to 32, b is of the order of 1000 and P is of the order of 100000. Also note that the storage complexity in case of APL does not depend on the number of components in fullpath. Hence, using APL table 300 reduces the storage I/O bandwidth compared with using a traditional lookup method. Therefore, the lookup and pathwalk commands may be executed more efficiently when APL table 300 is used.

APL table 300 data structure may also be used to manage the hierarchy of objects in a file system in a standalone manner. In the previous examples, APL table 300 has been described in the context of existing file system architectures. It is also possible to use APL table 300 in a new file system that does not use the traditional method of organizing file objects as a list of directory entries inside the data blocks of directory inodes (as shown in FIG. 3C). Instead, these file systems can use one or more embodiments of the methods of the invention to implement a file hierarchy/namespace based solely on APL table data structures. In those file systems the file system is not traversed inode-by-inode, but instead a single entry is read from an APL table 250 to perform a lookup or pathwalk command.

Whether used as a standalone file system or in addition to a conventional file system, the APL table data structure provides a hierarchical namespace that withstands data storage units of a logical volume going offline without compromising the access to the still online file objects in the hierarchy. Users of the file system are able to access all inodes of online data storage units through the APL table when the APL table is fully populated or access a portion of the inodes of the online data storage units when selection is used to limit the directories that are available. The APL table may be used with conventional logical volume managers to provide useful enterprise features such as the ability to hot-replace data storage units without changing the file system address space, hot-extend logical volume length by adding new data storage units, software redundant array of inexpensive disks (RAID) availability features, data mirroring and replication over multiple data storage units, and the like.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

We claim:

1. A method of generating a hierarchical file system having a first set of file objects stored in a first data storage unit and a second set of file objects stored in a second data storage unit, said method comprising:
creating a first table including path entries specifying paths and file object identifiers for a file object in the first set of file objects stored in the first data storage unit;
storing the first table in the first data storage unit;
creating a second table including path entries specifying paths and file object identifiers for a file object in the second set of file objects stored in the second data storage unit, wherein for a given file object a corresponding file object identifier includes a unique identifier, an inode number for the given file object, and a generation number for the given file object; and storing the second table in the second data storage unit.

2. The method of claim 1, wherein one of the path entries of the first and second tables for a file object specifies a partial path for said file object.

3. The method of claim 1, wherein one of the path entries of the first and second tables for a file object specifies a complete path for said file object.

4. The method of claim 1, wherein each path entry of the first table includes an index number that is a unique integer when compared with all the entries stored in the first table, and each path entry of the second table includes an index number that is a unique integer when compared with all the entries stored in the second table.

5. The method of claim 1, wherein a path entry is inserted in the first table or the second table when a file object corresponding to said path entry is created or renamed.

6. The method of claim 1, wherein a path entry is inserted in the first table or the second table by a background process some time after a file object corresponding to said path entry is created or renamed.

7. The method of claim 1, wherein a path entry is removed from the first table or the second table by a background process some time after a file object corresponding to said path entry is deleted.

8. The method of claim 1, further comprising:
determining that a file object needs to have a path entry in the first or second table prior to creating the path entry corresponding to said file object.

9. The method of claim 1, further comprising:
removing a path entry for a file object from the first table when said file object is renamed or deleted from the first data storage unit; and
removing a path entry for a file object from the second table when said file object is renamed or deleted from the second data storage unit.

10. A non-transitory computer readable medium comprising instructions executable in a computer system to cause the computer system to carry out a method of generating a hierarchical file system having a first set of file objects stored in a first data storage unit and a second set of file objects stored in a second data storage unit, said method comprising:
creating a first table including path entries specifying paths and file object identifiers for a file object in the first set of file objects stored in the first data storage unit;
storing the first table in the first data storage unit;
creating a second table including path entries specifying paths and file object identifiers for a file object in the second set of file objects stored in the second data storage unit wherein for a given file object a corresponding file object identifier includes a unique identifier, an inode number for the given file object, and a generation number for the given file object; and
storing the second table in the second data storage unit.

11. The non-transitory computer readable medium of claim 10, wherein one of the path entries of the first and second tables for a file object specifies a partial path for said file object.

12. The non-transitory computer readable medium of claim 10, wherein one of the path entries of the first and second tables for a file object specifies a complete path for said file object.

13. The non-transitory computer readable medium of claim 10, wherein each path entry of the first table includes an index number that is a unique integer when compared with all the entries stored in the first table, and each path entry of the second table includes an index number that is a unique integer when compared with all the entries stored in the second table.

14. The non-transitory computer readable medium of claim 10, wherein a path entry is inserted in the first table or the second table when a file object corresponding to said path entry is created or renamed.

15. The non-transitory computer readable medium of claim 10, wherein a path entry is inserted in the first table or the second table by a background process some time after a file object corresponding to said path entry is created or renamed.

16. The non-transitory computer readable medium of claim 10, wherein a path entry is removed from the first table or the second table by a background process some time after a file object corresponding to said path entry is deleted.

17. The non-transitory computer readable medium of claim 10, wherein the method further comprises: determining that a file object needs to have a path entry in the first or second table prior to creating the path entry corresponding to said file object.

18. The non-transitory computer readable medium of claim 10, wherein the method further comprises: removing a path entry for a file object from the first table when said file object is renamed or deleted from the first data storage unit; and removing a path entry for a file object from the second table when said file object is renamed or deleted from the second data storage unit.

* * * * *